Figure 1:
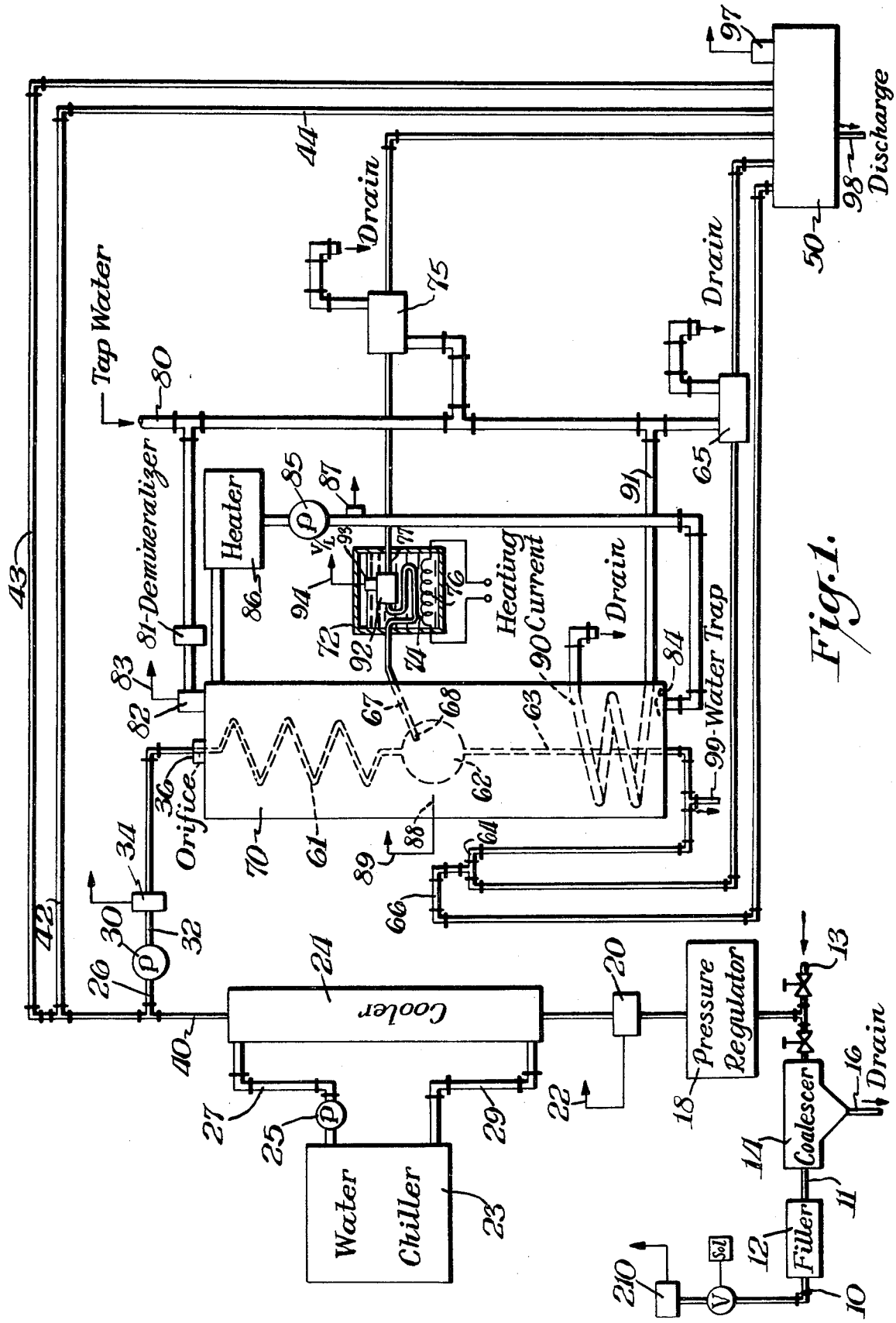

United States Patent
Ludt et al.

[15] 3,686,924
[45] Aug. 29, 1972

[54] CONTINUOUS V/L MEASURING

[72] Inventors: William C. Ludt, Yonkers, N.Y. 10710; Edward P. Watson, Westport, Conn. 06880

[73] Assignee: Ethyl Corporation, New York, N.Y.

[22] Filed: Feb. 9, 1970

[21] Appl. No.: 9,561

[52] U.S. Cl.....................................73/53, 73/61.3
[51] Int. Cl.......................G01n 11/00, G01n 33/22
[58] Field of Search...............73/61 R, 53, 61.3, 64.2

[56] References Cited

UNITED STATES PATENTS

| | | | |
|---|---|---|---|
| 3,276,460 | 10/1966 | Feld | 73/53 X |
| 3,491,585 | 1/1970 | Hass | 73/53 |
| 3,528,439 | 9/1970 | Plucker | 73/61.3 X |
| 3,528,440 | 9/1970 | Plucker | 73/61.3 X |

Primary Examiner—Louis R. Prince
Assistant Examiner—Joseph W. Roskos
Attorney—Donald L. Johnson

[57] ABSTRACT

The ratio of vapor to liquid volumes produced by a volatile liquid like gasoline, is determined at selectable temperatures by moving a stream of the liquid at a precisely maintained rate and measuring flow rate evolved vapor. Such vapor flow rate gives desired ratio directly, and is preferably measured by laminar flow meter or mass flow meter or the like, to produce an output proportional to the volume rate of flow and readable as electrical signals. A series of protective safeguard devices guard against hazards and against being misled by a signal obtained while operating conditions are not proper.

7 Claims, 2 Drawing Figures

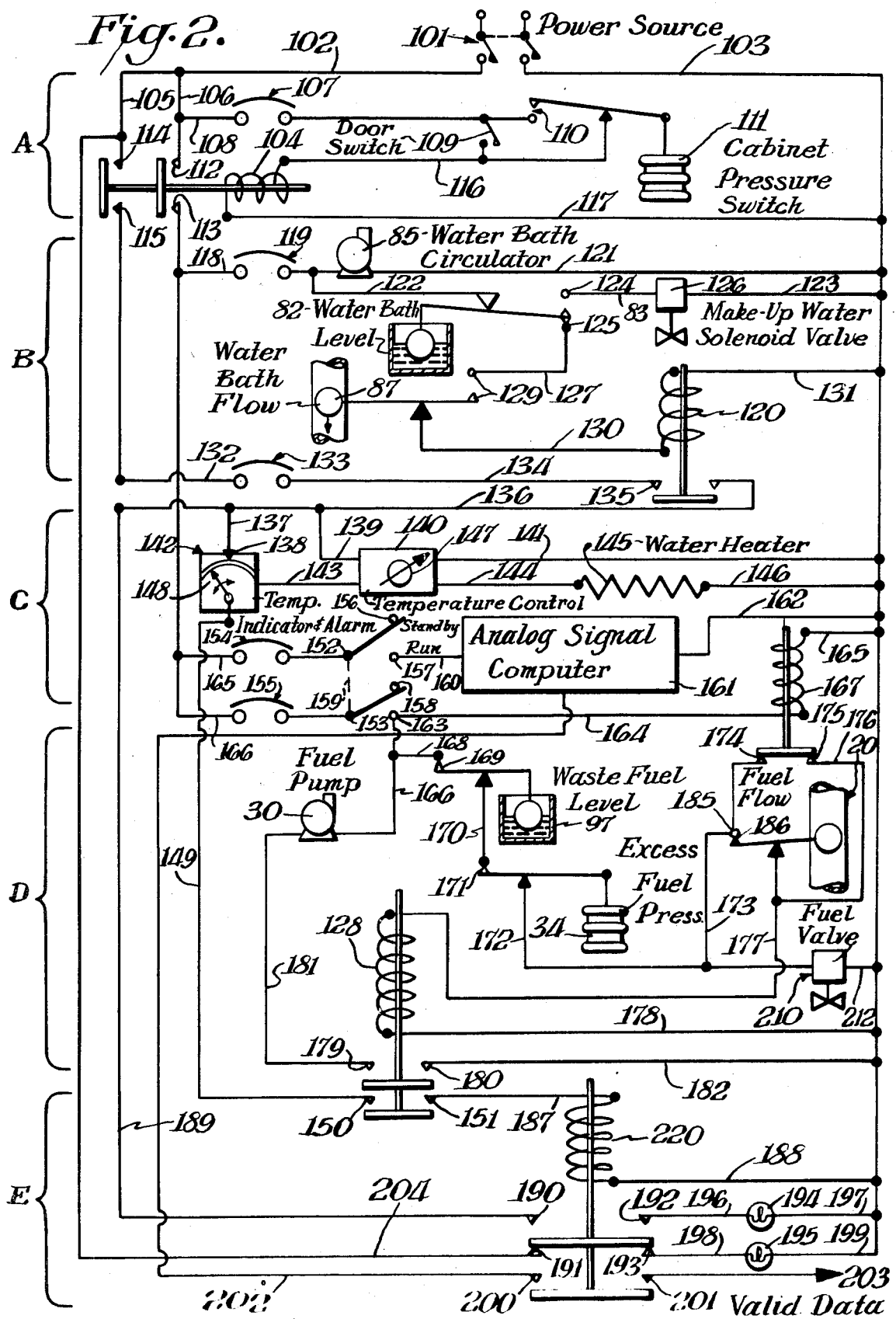

CONTINUOUS V/L MEASURING

The present invention relates to the continuous measurement of vapor to liquid volumes provided by gasolines or the like at preselected temperatures. U.S. Pat. No. 3,491,585 granted Jan. 27, 1970 illustrates such measurement.

Among the objects of the present invention are the provision of novel V/L measuring apparatus and techniques that give improved and more reliable measuring.

The foregoing as well as additional objects of the present invention will be more fully understood from the following description of several of its exemplifications, reference being made to the accompanying drawings wherein:

FIG. 1 is a somewhat schematic illustration of the essential parts of a V/L measuring apparatus representative of the present invention; and FIG. 2 is a circuit diagram of a safeguard system for a V/L measuring apparatus of the type shown in FIG. 1.

According to the present invention a continuous V/L measuring system for volatile liquids is improved by arranging for an unvarying stream of the test liquid to be pumped through the V/L measurement system by metering means such as a gear pump having an intake with a fixed hydrostatic head and an outlet with a fixed resistance to flow, the pump being connected for operation by a synchronous motor.

With an unvarying flow of the liquid it is only necessary to measure the flow rate of the vapor produced to determine the V/L ratio. The previous practice of dividing the vapor flow measurements by the liquid flow measurements becomes unnecessary in view of the fact that pursuant to the present invention the liquid flow rate can be considered constant.

The pumping of the test liquid is also improved by having the pump intake connected as a lateral take-off from the hydrostatic head so that any bubbles in the test liquid tend to move up the head rather than into the pump intake. To further minimize bubble problems the incoming stream of liquid can be cooled.

A feature of the present invention is the interconnection of a number of critical measuring means so that the system will not operate when unsafe and will not give valid data unless operating properly.

Referring now to the drawings, the apparatus shown in FIG. 1 has an inlet connection 10 for gasoline or other volatile liquids to be tested. The inlet leads through conduit 11 to a filter 12 which can be of the self-cleaning type if desired, and then to a coalescer 14 where droplets of water or other impurities suspended in liquid form, are coalesced. A drain connection 16 is provided for draining the coalesced impurities. A suitable coalescer contains a phenolic resin impregnated fiberglass screen wrapped into a multi-turn cylinder through the wall of which the test liquid passes. Should the impurities be lighter than the liquids tested the drain can be replaced by a top bleed. A chamois skin water barrier can be used in place of the coalescer.

The test liquid then moves through a pressure regulator 18 which can be adjusted so that the liquid moves through the remainder of the apparatus at a relatively low pressure such as not over 3 to 5 pounds per square inch. The fuel conduit then goes through a flow indicator 20 having an electrical output 22, a cooler 24, and from there into the input 26 of a metering pump 30.

The cooler can be a very simple insulated water jacket surrounding the intake conduit, with a water chiller 23 such as an ordinary drinking water cooler connected by means of a circulating pump and piping 27, 29 to circulate the chilled water through the jacket of the cooler. The conduit for the test liquid emerges from the cooler at 40 and from there extends upwardly to a level 42 that provides a predetermined hydrostatic head above the metering pump inlet 26. Also pump intake 26 comes off as a lateral connection from the conduit length that provides the hydrostatic head so that any bubbles of air or volatile material in the test liquid tend to rise to the top of the head rather than move into the pump intake. An excess of test liquid is arranged to flow into the conduit 40 so that there is more than enough to supply the intake of pump 30 and also more than enough to assure that the test liquid occupies the entire height of the hydrostatic head to level 42. The excess liquid flows out through conduit 42 and then down through conduit 44 to a discharge tank 50. An outlet 32 for metering pump 30 passes through a pressure indicator 34 and through a restricting device 36 such as an aperture, down into an evaporating coil 61 in insulated water tank 70. The evaporating coil provides a relatively long length of conduit, 23 feet for example, and continues part way into the tank 70, flaring gradually into a vapor-disengaging ball 62 from the bottom of which a liquid outflow 63 carries unvolatilized liquid out of tank 70 through liquid-level trap 64 and cooler 65, and from there into the discharge tank 50.

To prevent syphoning, conduit 42 and trap 64 are each provided with an anti-siphon vent 43, 66 respectively, both also leading to the discharge tank 50.

From a side of the vapor-disengaging ball 62 vapor is withdrawn through vapor line 67 which has its intake end 68 projecting inwardly and somewhat downwardly into the ball so as to keep liquid from finding its way out through line 67. The vapor is then led out of the tank 70 through a second heating tank 72, then through cooler 75 and into the discharge tank 50.

Tank 70 is a vaporizing tank and is kept substantially filled with heating liquid such as water originally supplied as from a tapwater inlet 80 through a demineralizer 81 and an automatic level control 82, which control also delivers an electrical signal at lead 83 to indicate that the liquid level is up to the minimum used during V/L measurement. A circulating pump 85 circulates the water through the tank and through a heater 86 which can be electrically heated and automatically connected for operation in response to signals of a temperature-sensing member 88 having an output lead 89. For better operation the tank 70 is also provided with a cooler coil 90 through which tapwater is also drawn as by means of pipe 91, to provide a load for the heater. This not only makes the temperature control more accurate but also enables more rapid cooling when changing from one V/L measuring temperature to a lower one. Also a diverter or spreader 84 can be placed at the inlet of the heated water into the tank 70 to distribute the incoming water.

Tank 72 can be maintained at a temperature higher than tank 70 as by substantially filling it with a heating oil 74 and providing it with an electric heating element 76. Within tank 72 a flow meter 92, which is preferably of the laminar flow type, is connected to the vapor conduit 77 and develops a pressure differential that is directly proportional to the rate of vapor flow. A pressure-to-voltage transducer 93 is in communication with the flow meter 92 and in turn delivers through lead 94 an electrical signal indicative of the vapor flow through the flow meter. The pressure differential developed in the flow meter need not be very great, and good measurements are made with such pressure differential no greater than 1 or 2 inches of water.

Vapor line 67 can also be arranged to pass in contact with more of the heated liquid 74 in tank 72, as by means of extra loops, to assure proper heating of the vapor before it gets to the flow meter 92.

FIG. 1 also shows a level-sensing unit 97 provided at the discharge tank 50 to indicate when the level in that discharge tank gets too high. The tank is discharged through outlet 98 that can return the liquid being tested to any suitable location such as back into a sampling loop downstream of test inlet 10, using a suitable pump. Also the coolers 65 and 75 can be directly operated either in parallel or series from water inlet 80. A drain 99 is connected at the low spot of trap 64 to drain out water condensate or other foreign immiscible liquids that might find their way into the test stream. In addition a separate intake connection 13 can be used to flow calibrating or purging liquids through the apparatus.

The temperature of tank 70 can be arranged to be set at any suitable testing value such as in 10° steps or less from 100° to 180°F for blended gasolines. For other liquids such as refinery stocks the temperature range can be much broader. When the temperature is set and the apparatus is operating, metering pump 30 which is preferably of the gear type and driven by a synchronously driven motor, operates with a fixed hydrostatic head at its intake and a fixed outflow resistance at its outlet so that it delivers test liquid at an unvarying rate of flow and the liquid so delivered is essentially free of bubbles or any other foreign material. Vaporization caused in coil 61 brings the liquid into equilibrium with its vapor when it reaches vapor-disengaging ball 62 which acts as a thin film separator and thus completes the equilibration. The vapor then moves out through conduit 67 separately from the unvolatilized liquid, which liquid leaves through conduit 63. Trap 64 is at a level corresponding to that of the bottom of ball 62 so that the pressure within the ball is substantially atmospheric, although this can be changed to values above or below atmospheric if desired. For example the pressure at high altitudes can be simulated when the apparatus is at low altitude by controlling the absolute pressure on the system atmospheric vent connected at the discharge tank 50.

Tank 72 is heated to a temperature above that of tank 70 in order to assure that the vapor emerging through line 67 does not condense until after it flows through the flow meter 92. 200°F is a suitable temperature for tank 72 where tank 70 can be set at temperatures up to 180°F for example. Between the two tanks the vapor lead 67 should be well insulated against thermal losses.

The V/L signal taken from lead 94 in the above arrangement will then be proportional to the number of volumes of vapor formed from one volume of entering test liquid at the temperature at which tank 70 is set. It is only necessary to apply a proportionality factor and a correction to reflect the difference between the vaporization temperature in tank 70 and the measuring temperature in tank 72. A temperature-correcting multiplier is derived from the following formula:

Temperature-correcting multiplier
$$= \frac{460 + \text{evaporating temperature (° F.)}}{660}$$

A simple dropping potentiometer can be set at the multiplier value or at a value corresponding to the product of that multiplier and the proportionality factor, to directly give the V/L measurement from the output lead 94 with or without intervening amplification. Also the V/L value can be compared with a preset setpoint to provide a difference of delta V/L signal.

The equipment is best calibrated by operating it with a liquid that provides a known V/L value and adjusting a dropping potentiometer connected across the output of transducer 93, so as to give the correct result. The apparatus will then be set for use in any other liquid. Because there is very little thermal expansion of the test liquid over the range of measuring temperatures in tank 70, there is no need to make any adjustment for different measuring temperatures.

One of the problems with making V/L measurements on gasolines is that such measurements are seriously disturbed when the gasolines are contaminated with even a little water. Drain 99 can be opened periodically either manually or automatically to remove any moisture that accumulates in the trap. Also if desired the coalescer can be moved to the downstream side of pressure regulator 18 or downstream of the cooler.

FIG. 2 shows a very effective arrangement for interconnecting the portions of the equipment so as to simplify and mechanize the readings as well as contribute to operating safety. As there shown, power switch 101 provides a source of electrical current between lines 102 and 103. As in the conventional 110-volt AC power systems, line 103 is grounded and line 102 is the hot line.

Conductor 102 supplies power to conductors 105 and 106 to form the two main branches of the system. The current flow from conductor 106 passes through conductor 108 and then through circuit breaker 107 to a door safety switch 109 and air purge pressure switch 110. These are shown in the open position and can be located in an enclosed pressurized electrical compartment or cabinet that can house all the control switches and relays at which dangerous sparking can occur. No current can flow through conductor 106 until switch 110 is closed to assure safe operation. When the cabinet door is closed, door switch 109 which is inside the cabinet, is open and when cabinet instrument air is turned on, pressure switch 111 will close contacts 110 permitting current to flow through conductor 116 and energize the coil of normally open relay 104 by completing the circuit through conductor 117 to conductor 103. At the same time the cabinet pressure prevents any fuel vapor from seeping into the cabinet where they could otherwise be ignited by a spark. Switch 109 is open under all conditions except when manually closed to permit current flow for maintenance operations. At those times the door to the instrument enclosure is open and contacts 110 are open because air pressure will not build up in the cabinet while the door is open.

Upon energization of relay 104, contacts 112 and 113 close and permit current to flow through the extension of conductor 106 to branch conductor 118 through circuit breaker 119, actuating constant temperature water bath circulating pump 85 by completing the circuit through conductor 121 to conductor 103. In addition, conductor 122 connected to an extension of conductor 118 leads to a water bath level control 82 with dual contacts 124 and 125. As illustrated, the water level control has a float which in operating condition permits current flow through the closed contacts 125 through conductor 127. If the water level falls below operating limits the float drops causing electrical closure with contact 124 which causes current to open the makeup water solenoid valve 126 by way of current flow through conductors 83 and 123. When sufficient water has been added to the system to restore the float to the preset operating level, contact 124 will be disengaged and the system again will be as shown with current through conductor 127 and to contact 129 of a circulating water flow sensor 87, shown in zero flow position. However when bath circulating pump 85 is actuated and water bath level sensor has assured proper water level, the vane of the flow sensor deflects in the direction of water flow causing contacts 129 to close and permitting electrical current flow through conductor 130 and actuating the coil of normally open constant temperature bath heater relay 120 by completing the circuit to the conductor 103 through conductor 131. This closes relay contacts 135, which are supplied with current by conductor 105 by virtue of energized relay 104 as described earlier and the closing of contacts 114 and 115, then through branch conductor 132, circuit breaker 133 and conductor 134.

The closing of contacts 135 causes current to flow through lead 136 to supply electrical current to conductor 139 for temperature control 140 with the circuit completed through conductor 141 to neutral conductor 103. The temperature control 140 is a three mode controller which modulates the current input to water bath heater 145 through conductor 144 and completes the electrical circuit to the neutral conductor 103 through conductor 146. The temperature control desired is adjusted by dial 147 in the conventional manner and the temperature of the circulating water bath is sensed by a resistance type temperature sensor 88 immersed in the bath. The temperature sensor transmits a signal to the temperature control 140 through conductor 89 which modifies and amplifies the signal in a conventional manner and determines its deviation from the preset temperature desired. An electrical signal representing this difference is transmitted to the temperature indicator and alarm 142 through conductor 143. When the difference between the temperature represented by the temperature adjust dial 147 and the temperature measured by the temperature sensor is zero, showing that the desired temperature has been attained, indicator dial 148 will have its contact at midscale where it engages contact 138 connected to branch conductor 137 and conductor 136. This will permit current to flow through conductor 149 to contact 150 of normally open relay 128.

In the above arrangement the system will be in partial operation with the instrument cabinet, constant temperature circulating bath and temperature control activated.

The system is in reality in a standby condition as indicated by the two position operational switch 159 which receives its current flow from the extension of conductor 106 through branch conductors 165 and 166 and circuit breakers 154 and 155. In the position shown contacts 152 and 156 and 153 and 158 are inactive, keeping the system in standby condition. When operational switch 159 is turned to RUN position, contacts 152 and 157 close providing current to the analog signal computer 161 through conductor 160 and completing the circuit to neutral conductor 103 through conductor 162. At the same time contacts 153 and 163 close, permitting current to flow through conductors 164 and 166. Conductor 164 energizes the coil of relay 167 by completing the circuit to conductor 103 through conductor 165. Relay 167 is a normally closed delay relay which opens 15 to 60 seconds after current is applied. This permits fuel metering pump 30 to start operation and to supply fuel flow and pressure to the system notwithstanding the inhibiting sensors. As can be seen from the illustration the current flow through contacts 153, 163, causes current to flow through conductors 166 and 168, completing the circuit to coil of fuel metering pump relay 128 through contacts 169 of excess waste fuel level sensor 97, conductor 170, contacts 171 of excess fuel pressure switch 34, conductors 172 and 173; contact points 174 and 175 of normally closed delay relay 167, conductors 176, 177 and 178. Actuation of normally open relay 128 closes the circuit between contact 179 connected to conductor 181 from fuel metering pump 30 and contact 180 through conductor 182 to AC neutral conductor 103. At the same time the current available in conductor 172 opens fuel solenoid valve 210 by completing the return to conductor 103 through conductor 212.

The opening of fuel solenoid valve 210 makes fuel available to the inlet side of fuel metering pump 30. Fuel is delivered to the system to actuate sensors 20, 34 and 97.

After 15 to 60 seconds, delay relay 167 opens breaking contacts 174 and 175. By this time sufficient flow must have been obtained to close contacts 185 and 186 of flow sensor 20 and thus bypass contacts 174 and 175 to maintain operation. If insufficient fuel was delivered through fuel solenoid valve 210, insufficient fuel will flow through fuel flow sensor 20 and relay contacts 185 and 186 will stay open. In this event relay 128 will open and fuel metering pump 26 will cease to operate. On the other hand if sufficient fuel flow has been established but the excess waste fuel level sensor 17 is activated by a build-up of an excessive amount of waste fuel due to waste tank drain stoppage or other causes, contacts 169 will open and again relay 128 will open. Similarly when excess pressure occurs at the fuel metering pump outlet, the continuity of the circuit to relay 128 will be broken by the opening of contacts 171 of excess fuel pressure sensor 34.

With relay 128 actuated, contacts 150 and 151 are closed and pass current from conductor 149 when the constant temperature water bath is at specified temperature. This actuates normally closed valid data relay 220 by completing the circuit to AC neutral conductor 103. On actuation of relay 220, however, contacts 190 and 192 are connected to complete the circuit with conductor 189 which is an extension of conductor 136 discussed earlier, and through conductors 196 and 197 to light Valid Data signal lamp 194. At the same time signal contacts 200 and 201 are connected and the signal from conductor 202 of analog signal computer 161 is transmitted through signal conductor 203 to an external control device.

It can be seen therefore, if any of the prescribed conditions in Circuit A are not satisfied, relay 104 will not close and no current will flow except through conductors 198, 199 to the Invalid Data lamp 195 as shown.

Similarly, if any one or any combination of the elements in Circuits B, C, or D detect a departure from prescribed conditions, relays 120, 167 or 128 related to the circuit will not be energized and accordingly neither will relay 220. The entire system accomplishes its designed purpose by inhibiting the transmission of an invalid control signal and assuring that the signal output to an external control device was derived and is representative of the operating conditions prescribed.

Other circuit arrangements can also be used to prevent reliance on invalid data. For example the water level sensor 82 can be disconnected from the circuit that controls the operation of the heater 145, and inserted instead in lead 149. It will in this way still show when the data is invalid, but will not interfere with the heating of the water.

In the interest of safety any electrical switching effected outside the pressurized cabinet is arranged to be conducted through leads that have their electric current supply limited to so low a value that no dangerous sparking can take place.

The V/L signal or better still, the delta V/L signal obtained as above indicated can also be readily used to automatically control the blending of butanes or other highly volatile ingredients in gasoline, so as to meet any desired preset V/L value. A similar control can be effected where other types of liquids are tested.

In the event the liquid being tested becomes seriously contaminated as by condensation of moisture, the conduits carrying the test liquid can be flushed with a cleansing liquid. Where the test liquid is gasoline the flushing liquid can be dry ethanol or acetone or similar liquid that dissolves the water and that is also soluble in gasoline.

The gear pump referred to above is one type of metering means for providing the desired constant volume rate of flow. Any other type of continuous metering means, such as a centrifugal pump operating at a constant differential between inlet and outlet pressures, or a motor driven piston pump having a displacement sufficient for a test run, may be used instead.

Obviously many modifications and variations of the present invention are possible in the light of the above teachings. It is, therefore, to be understood that within the scope of the appended claims the invention may be practiced otherwise than as specifically described. The filter and coalescer can for instance be combined in a single unit.

The application of this apparatus can be other than described in that it can have usefulness as a laboratory tool for vapor-liquid ratio determinations for specific preset temperatures or by controlling to specific vapor pressures by adjustment of separator bath temperatures until the desired V/L ratio is indicated.

It can also be used in obtaining a dynamic temperature relationship of vapor-liquid ratio by programming separator bath temperature increase at a constant or intermittent rate and simultaneously recording both bath temperature and V/L ratio produced. In this application the electrical outputs representing V/L measurement and temperature could be the input to an X-Y recorder and the resultant curve obtained would represent the temperature-V/L profile of liquid. For this application it is desirable to keep the amount of separator bath liquid as small as possible for rapid temperature response.

Conversely, it is also within the scope of this invention to start the test with the liquid separator bath at a high temperature and gradually cool the apparatus through a measured rate of flow of cooling water and simultaneously record bath temperature and V/L ratio to obtain the volatility profile.

In addition, the basic principles of the apparatus can be applied to the measurement of gaseous products as well if operating conditions are adjusted accordingly. It can be seen that if a mixture of gases of different dew points is metered into this apparatus at a constant flow rate, and the vapor-liquid separator cooled, the constituent vapors with high dew points will condense and the remaining volume measured by the vapor flow meter will be measure of the vapors which will not condense at the depressed temperature. For this type of an application the test gases can be heated to 200°F or other suitable temperature before being metered into the metering pump to assure that the entire volume is above the dew point. Since the gases measured through the flow meter are also at the foregoing temperature, the relationship between gases metered in and gas measured out can be used to determine the percent of gas with dew points at or above the separator bath temperature. This application of the apparatus can be quite useful for monitoring or controlling stripping columns or any other process where it is desired to minimize high dew point or high boiling point components.

A suitable laminar flow meter for application in the equipment is described in U.S. Pat. No. 3,220,256 issued Nov. 20, 1965.

What is claimed is:

1. In a continuous V/L measuring system having a flow conduit for volatile liquids, a disengaging chamber connected to the conduit for causing vapor formed from the flowing liquid to be separated from the liquid, means for moving the liquid through the flow conduit and into the disengaging chamber, and means for measuring the flow of the separated vapor, the improvement according to which the means for moving the liquid is a constant flow metering means with an intake having a fixed hydrostatic head and an outlet having a fixed resistance to outflow, the metering means being connected for operation by a synchronous motor to move an unvarying stream of the liquid into the flow conduit.

2. The combination of claim 1 in which the metering means has an intake which is a lateral connection from the hydrostatic head, so that any vapor bubbles in the incoming liquid stream tend to move up the hydrostatic head rather than into said intake.

3. The combination of claim 1 in which the system also includes a cooler connected to reduce the temperature of the liquid stream moving to the metering means.

4. A continuous V/L measuring system for volatile fuels, said system having an enclosed electrical compartment including control switches, a pressuring connection for keeping the interior of the compartment at a pressure somewhat greater than that around it to keep fuel vapors from accumulating therein, and an interlock connected to disable the measuring when the pressure in the compartment is not high enough for safety, the system also including a liquid bath for heating to a predetermined temperature the liquid fuel whose V/L is to be measured, means for indicating when that bath is at an appropriate level, means for indicating the circulation of the heating liquid through that bath, means for determining when the heating liquid is at the predetermined temperature, the system further including a flow actuator for moving an enclosed stream of the fuel through the bath, means for determining when excessive fuel is discharged from the system, means for determining when the pressure of the moved fuel is excessive, means for determining when the fuel is flowing in the system, and an indicator connected to produce a warning signal when any of the named means is not in proper condition.

5. The combination of claim 4 in which the system also includes a run switch connected to operate the flow actuator and cause flow of fuel for a short period of time notwithstanding the conditions of the fuel-flow determining means, and to then terminate the operation of the flow actuator in the event any of the named means is not in proper condition.

6. A process for measuring the V/L characteristics of a volatile liquid, which process comprises passing a stream of said liquid at a constant flow rate and under a constant head into a vaporization zone held at a temperature that causes some of the liquid to be converted to vapor, separating the thus evolved vapor from the stream of liquid, and obtaining the desired V/L characteristic by measuring the rate at which the vapor is evolved.

7. The process of claim 6 in which the volatile liquid is gasoline and the vapor evolution rate is the only measurement made for obtaining the V/L ratio.

* * * * *